United States Patent
Aviani et al.

(10) Patent No.: US 7,624,184 B1
(45) Date of Patent: Nov. 24, 2009

(54) METHODS AND APPARATUS FOR MANAGING ACCESS TO DATA THROUGH A NETWORK DEVICE

(75) Inventors: James A. Aviani, Santa Barbara, CA (US); Carl D. Sutton, Portola Valley, CA (US); Douglas A. Gourlay, Sausalito, CA (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 09/875,543

(22) Filed: Jun. 6, 2001

(51) Int. Cl.
*G06F 15/16* (2006.01)

(52) U.S. Cl. .............. 709/227; 709/212; 709/213; 709/216; 709/225; 709/228; 709/229; 709/232; 709/237; 709/239

(58) Field of Classification Search ......... 709/227–229, 709/203, 237, 212–213, 216, 225, 232, 239
See application file for complete search history.

(56) References Cited

U.S. PATENT DOCUMENTS

| | | | |
|---|---|---|---|
| 5,644,720 A * | 7/1997 | Boll et al. ................. | 709/227 |
| 5,708,780 A * | 1/1998 | Levergood et al. ......... | 709/229 |
| 5,774,660 A * | 6/1998 | Brendel et al. ............ | 709/201 |
| 5,841,970 A * | 11/1998 | Tabuki ....................... | 713/201 |
| 5,867,652 A * | 2/1999 | Hurvig ....................... | 709/203 |
| 5,991,810 A * | 11/1999 | Shapiro et al. ............ | 709/229 |
| 6,272,148 B1 * | 8/2001 | Takagi et al. .............. | 370/469 |
| 6,310,892 B1 * | 10/2001 | Olkin ......................... | 370/473 |
| 6,330,602 B1 * | 12/2001 | Law et al. .................. | 709/224 |
| 6,389,462 B1 * | 5/2002 | Cohen et al. .............. | 709/218 |
| 6,415,329 B1 * | 7/2002 | Gelman et al. ............ | 709/245 |
| 6,457,054 B1 * | 9/2002 | Bakshi ....................... | 709/227 |
| 6,507,562 B1 * | 1/2003 | Kadansky et al. .......... | 370/216 |
| 6,606,663 B1 * | 8/2003 | Liao et al. .................. | 709/229 |
| 6,643,774 B1 * | 11/2003 | McGarvey ................. | 713/155 |

(Continued)

OTHER PUBLICATIONS

Foundry Networks. "Network Appliance And Foundry Networks Announce Interoperability Partnership" Sunnyvale, CA—Mar. 8, 1999. Retrieved from http://www.foundrynet.com/about/newsevents/releases/pr3_8_99.html on Nov. 18, 2004.*

(Continued)

*Primary Examiner*—Alina N. Boutah
(74) *Attorney, Agent, or Firm*—Patterson & Sheridan, LLP

(57) ABSTRACT

The invention is directed to techniques for managing access to data available from a data access device using a network switching protocol to manage content requests from clients. A data communications device receives a request for content from a client. The data communications device, such as a network switch, exchanges signals using the network switching protocol with one or more data access devices, such as a web cache. The data communications device can then select one data access device to provide the requested content to the client based, for example, on load balancing considerations. The data communications device sends a data transfer approval signal to the selected data access device. The selected data access device establishes a connection with the client using information, such as the client's network address, provided by the signals. The selected data access device then bypasses the data communications device and sends the requested content to the client. Using the network switching protocol, the data communications device can manage multiple, pipelined requests from the same client, while approving responses to the client from different data access devices, such as web caches and/or servers.

24 Claims, 5 Drawing Sheets

U.S. PATENT DOCUMENTS

| | | | |
|---|---|---|---|
| 6,658,480 B2 * | 12/2003 | Boucher et al. | 709/239 |
| 6,704,786 B1 * | 3/2004 | Gupta et al. | 709/228 |
| 6,721,316 B1 * | 4/2004 | Epps et al. | 370/389 |
| 6,725,272 B1 * | 4/2004 | Susai et al. | 709/229 |
| 6,732,117 B1 * | 5/2004 | Chilton | 707/103 X |
| 6,751,677 B1 * | 6/2004 | Ilnicki et al. | 719/316 |
| 6,768,716 B1 * | 7/2004 | Abel et al. | 370/230 |
| 6,788,704 B1 * | 9/2004 | Lindsay | 370/465 |
| 6,792,461 B1 * | 9/2004 | Hericourt | 709/225 |
| 6,909,708 B1 * | 6/2005 | Krishnaswamy et al. | 370/352 |
| 6,965,942 B1 * | 11/2005 | Young et al. | 709/232 |
| 7,111,061 B2 * | 9/2006 | Leighton et al. | 709/224 |
| 2004/0025052 A1 * | 2/2004 | Dickenson | 713/201 |

OTHER PUBLICATIONS

R. Braden, RFC 1644—T/TCP—TCP Extensions for Transactions Functional Specification, Jul. 1994.*

* cited by examiner

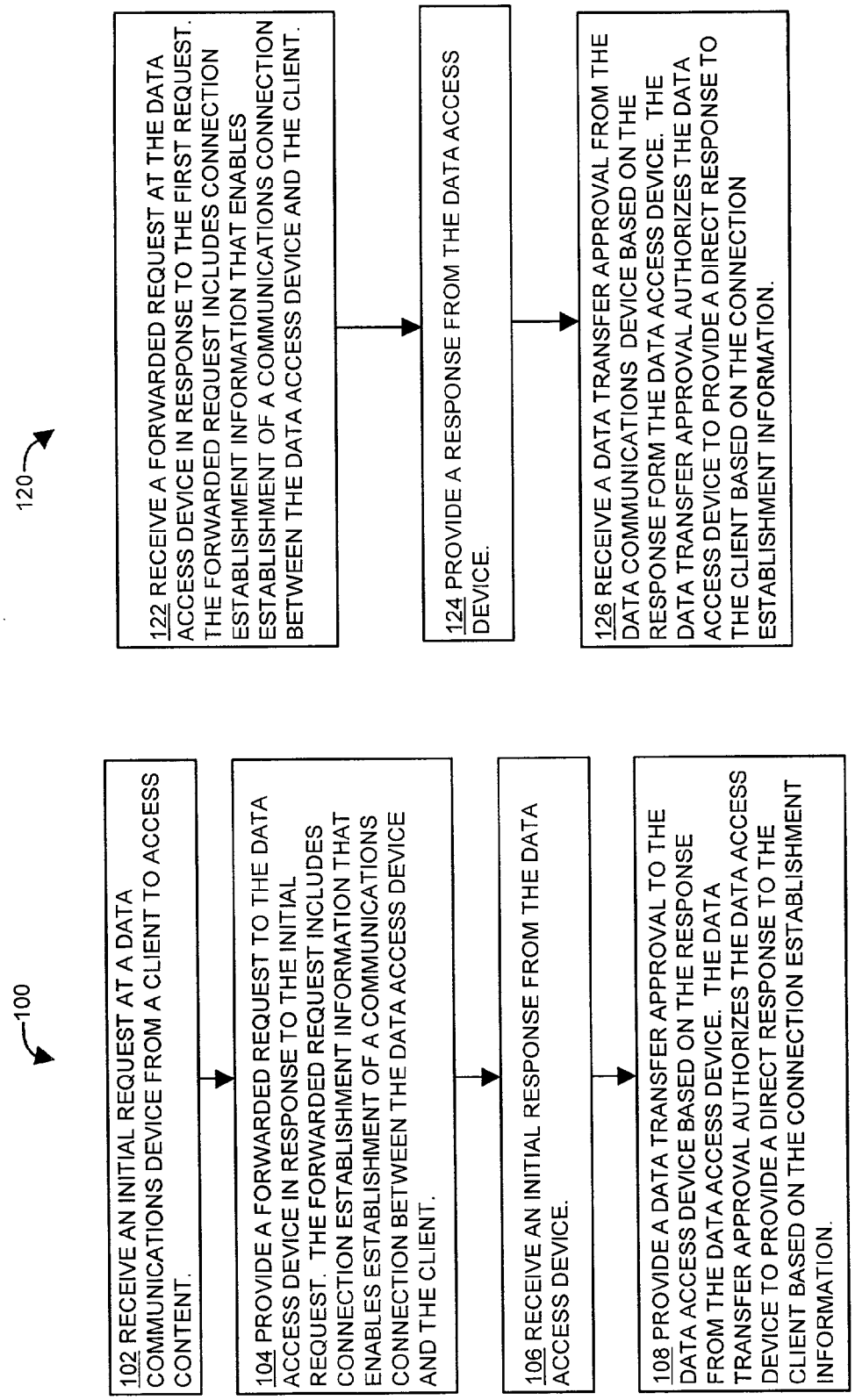

METHODS AND APPARATUS FOR MANAGING ACCESS TO DATA THROUGH A NETWORK DEVICE

BACKGROUND OF THE INVENTION

Computer networks such as the Internet can include many types of computer systems and network device such as routers and switches that are coupled together via data links to exchange information using data communications. Computer systems on such a network can communicate with each other and the network devices via various data communications protocols. As an example, a suite of protocols that computer systems and other devices use for data communications on the Internet provides what is known as the World Wide Web or simply the web. The primary protocol used for World Wide Web communications is the Hyper Text Transfer Protocol or HTTP.

According to the conventional operation of the World Wide Web, a user of a client computer can operate web browser software on the client computer to initiate a request for data from a web site. The client computer provides the HTTP request to a web site that can include a web cache or web server computer. The request identifies a specific portion of data such as a web page that a server or cache within the web site is to return to the client. In a typical configuration, one or more network devices such switches or routers operate as a "front-end" to the web site and receive the HTTP requests from client computers and control access to web server or cache computers within the web site. In such a configuration, a service provider, such as an Internet Service Provider (ISP) operating the web site, can provide multiple servers to provide responses to large numbers of requests provided by client computer users. Some network devices, such as content switches, can receive a request and determine from the content requested within the request that a specific server within the web site should respond to the request. Thus, the network device that initially receives a request (i.e., receiving device, such as a switch or router) does not necessarily provide the response directly, but can route the request to another network device, web cache, or web server to handle the response to the request.

More specifically, in a typical scenario of a reverse proxy environment in a data center, a web cache (e.g., server or router) can maintain a cache of content (e.g., web pages) that is frequently requested from client computers. The content itself originates from one or more web servers that reside within the web site "behind" the web cache (i.e., the cache caches the content in response to an initial request for the content that is handled by a web server). Thus, the web cache can often respond to clients' requests without having to obtain data from the servers in the web site or data center. As described above, a network device such as a router or switch (e.g., content aware switch) can serve as the receiving device that initially receives the request from a client computer, and then forwards the request to the web cache. If there is a cache miss (i.e., the data is not available in the cache), then the web cache can obtain the data from one of the web servers in the data center. In another configuration, in the event of a cache miss, the web cache sends the request back to the network device (e.g., switch) that initially received the request which then directs the request to an appropriate web server depending upon load or other criteria.

Various conventional redirection approaches allow a network device that receives an incoming request to redirect the request received to another network device, or to a web cache or web server to handle processing the response to the request. In one particular redirection approach, the receiving network device determines a redirect is required and sends an HTTP redirect request back to the client computer that indicates, to the client, an IP (Internet Protocol) address of a content server that can properly provide the requested content. Typically, the client can respond to the HTTP redirect request by terminating any TCP (Transmission Control Protocol) connection the client has established with the first receiving network device and by establishing a new TCP connection with a content server indicated in the redirect request. After establishing the new TCP connection with the indicated content server, then the client can send a new HTTP request to the content server over the newly established TCP connection. The content server can then provide the content requested in the HTTP request back to the client.

In another conventional approach to managing requests, the receiving network device (e.g., switch or router) translates the network addresses of the request and response so that the web server within the web site views the request as coming from the receiving network device, and the client views the response as also coming from the receiving network device. The approach is referred to as "Network Address Translation" (NAT), and is described in RFC 1631 of the Internet Engineering Task Force, entitled "The IP Network Address Translator (NAT)," the disclosure, teaching and contents of which are hereby incorporated by reference in their entirety. Typically, the NAT redirect approach is used if the receiving device serves as a proxy or intermediary for a group of web servers in a restricted domain (i.e., stub domain) having private IP addresses for use within the stub domain, but which are not made available (i.e., resolvable) globally to the Internet because, for example, they would conflict with the IP addresses used by other devices on the Internet. In such a case, the receiving device (e.g., stub router) has a public, globally available IP address and receives requests from clients to be serviced by servers in the stub domain.

In a conventional approach to managing a request from a client to data in a web cache, the web cache can locate a requested web object (e.g., page) from another web cache by exchanging messages with the other cache, as described in RFC 2186 of the Internet Engineering Task Force, entitled "Internet Cache Protocol (ICP), Version 2" the disclosure, teaching and contents of which are hereby incorporated be reference in their entirety. For example, a client can send a request for a web object to a web cache, and the web cache can send an ICP query to another web cache asking whether the other web cache has that particular web object.

In a conventional approach to managing multiple requests, a client can send multiple requests over the same persistent TCP connection. Also, using a technique called "request pipelining", as supported by HTTP version 1.1, requests can be sent on the same persistent connection without waiting for the response to each request. As an example of HTTP request pipelining, the client computer can establish a persistent TCP connection with a web server, and can then send more than one request for respective portions of data to the same web server over the same TCP connection without re-establishing a new TCP connection for each request and without waiting for a response from a former request before sending the next request.

SUMMARY OF THE INVENTION

The conventional approaches to managing requests as briefly described above present a number of problems for network devices and servers responding to such requests from clients. Such problems include handling many pipelined requests from the same client properly and/or request handling performance problems in general. The present invention significantly overcomes many of the issues and problems experienced in conventional web site operation with respect to handling requests for data.

For example if a conventional redirection approach is used in a reverse proxy environment, then there is a problem with the overhead of establishing and re-establishing many TCP connections, because each TCP connection is typically terminated when the redirection occurs. If a client computer cannot obtain the data from a web cache, then the client is typically redirected to another web server having the content, which requires terminating the TCP session with the web cache, and then expending the overhead of establishing a new TCP session with the web server that has the requested content. If the client provides a number of requests that are not serviced by the web cache, then the client and network must endure the overhead of repeatedly terminating and establishing new TCP sessions for each redirected request.

If a network device such as a content switch is used in a reverse proxy environment, then there is a problem with congestion at the switch, because all the responses to requests pass through the content switch. For example, the requests are received by the content switch, which then forwards them to the web cache, and, if there is a cache miss, then directs the requests to a server in the data center. The content switch can engage in load balancing by sending requests to different web caches and/or servers, if necessary. However, the content switch can experience congestion, because it then receives all of the responses, which then pass through the same content switch in order to be transmitted back to the clients who initiated the requests. In addition, the response must pass through the switch, which creates a delay as compared to a response that could travel from the web cache to the client without passing through the switch.

In alternative situations where a switch has to handle multiple, pipelined client requests arriving over the same persistent connection, first, the conventional switch must either forward the entire persistent connection to a cache or server and let the cache or server deal with the pipelining, or, second, the conventional switch must send only one request at a time to a cache or server to preserve the response order. The first option means that the second and beyond requests in the pipeline do not get switched appropriately to the correct cache or server. The second option drops most of the benefits of pipelining in the first place because the switch end up serializing the processing of requests. Conversely, the present invention as will be explained allows the requests to be processed in parallel and preserves the order of the responses.

In contrast to such conventional approaches, the invention is directed to techniques for forwarding a request, such as an HTTP request initiated by a client computer, from a network device equipped with the invention, such as a content switch, to a web cache (or other content delivery device such as a web server) that provides the response back to the client without requiring the response to pass through the switch.

As one example approach of the invention, a network device initially receiving the request, such as a content switch or router, can use a special protocol called a "Heads Up Switching Protocol (HUSP)" to forward the request to the web cache along with additional request information that can include source and destination IP addresses of the request, port information, TCP sequence numbers, client window information (e.g., TCP window information for receiving data), and other related request information, such as HTTP header information all based upon the initial request. The web cache can then use this request information to return content directly back to the client in a HUSP response that is sent to the client without passing through the switch. Thus, the content switch is not burdened with handling all of the responses, and the responses are not delayed due to passing through the content switch. In addition, the HUSP provides a request sequence number that facilitates returning responses from multiple requests by the client in the proper sequence. Thus, the client can provide multiple requests (i.e., pipelined requests) over the same connection to the content switch and can receive responses from the web cache (or other content deliver device) in the same order that the requests were made, without requiring the client to wait until receiving the response to each request before sending another request.

In general, the approach of the invention provides for improved performance, because the cache or other responding device can provide a response to the client without going back through the switch or other network device that initially received and handled the request. In addition, the approach of the invention also provides for pipeline handling as described above, and accurate load balancing, because the network device such as the content switch can send requests to multiple web caches, and can receive responses indicating usage levels, and can choose a web cache that is preferable based on the usage levels.

Certain embodiments of the invention can use a protocol called the Transaction Transmission Control Protocol (T/TCP or TTCP), as described in RFC 1644 document of the Internet Engineering Task Force, entitled "T/TCP—TCP Extensions for Transactions Functional Specification" the disclosure, teaching and contents of which are hereby incorporated be reference in their entirety. TTCP allows for connection establishment between a switch and a cache while avoiding the full TCP connection setup requirements for each connection, whereas conventional techniques require a full TCP handshake to occur between a switch and a cache for each connection that is established. Furthermore, the HUSP of this invention avoids redundant processing between the switch and the cache. As an example, the results of the switch's termination of the client's TCP connection and HTTP header parsing are shared with the cache (via containment of this information in the HUSP header) thereby avoiding duplication of this processing. In effect, a switch using this invention becomes a "cache accelerator" of sorts.

In one embodiment, the invention is directed to a method, in a data communications device (e.g., a content switch or other type of switch or a router), for providing access to data (e.g., web page or other content) from a data access device (e.g., web cache and/or web server) to a client (e.g., a client computer system operating a web browser) over a communications network (e.g., an IP network, such as the Internet or a local area network or LAN or wide area network or WAN). The method includes the steps of receiving a first request from a client to access data, providing a second request to access data to the data access device in response to receiving the first request, receiving a first response from the data access device, and providing a data transfer approval to the data access device in response to receiving the first response, the data transfer approval authorizing the data access device to establish the communication connection to the client based on connection establishment information and provide a second response to the second request to the client. The second request provides the connection establishment information that enables establishment of a communication connection between the data access device and the client. For example, the connection establishment information can include the client's TCP port, IP address, and receive window (e.g., size of the client's window to receive data). Thus the data access device can bypass the data communications device when sending the response to the client, and the data communications device is relieved of the burden of handling all of the responses to clients.

In another embodiment, the method further includes receiving the first request based on a request/response communications protocol (e.g., TCP), receiving a content identifier (e.g., as in an HTTP request) that identifies a requested content, and providing the content identifier to enable the data access device to access the requested content. For example, a content switch receives the HTTP request and then uses the HUSP protocol to forward the HTTP request as part of an HUSP request to a web cache.

In an additional embodiment, the method includes receiving a plurality of first requests to access data from the client, providing a plurality of second requests in response to receiving the first requests, each second request including a request sequence number, and providing a data transfer approval for each of a plurality of responses to the second requests in a sequence based on the request sequence numbers for the second requests. For example, a content switch can receive a number of pipelined HTTP requests from a client and use the request sequence number to insure that the responses are returned to the client from one or more web caches in an order corresponding to the order that the client sent the HTTP requests.

In another embodiment, the method includes providing a plurality of second requests to a plurality of data access devices, receiving a plurality of first responses from a subset of the plurality of data access devices that received the second requests, and selecting one of the subset of data access devices to provide the second response to the second request and providing the data transfer approval to the selected one of the data access devices. For example, after receiving a HTTP request from a client, a web switch can send out several HUSP requests (based on the HTTP request) to different web caches, and then select one of the web caches to respond to the client's HTTP request.

In a further embodiment, each first response includes usage information for each data access device in the subset that indicates a level of usage for each data access device in the subset, and the method includes comparing the usage information for all of the data access devices in the subset to determine the selected one of the data access devices from the subset having a preferable level of usage. For example, the web caches that have received HUSP requests (based on one HTTP request from a client) can provide usage information in HUSP responses to the content switch. The content switch can perform accurate load balancing by comparing the usage levels of the web caches to select a web cache having the lowest level of usage as the web cache responds to the HTTP request.

In another embodiment, the connection establishment information includes a current transmit window for the client that provides a window length for transmitting the second response to the client from the data access device. The window length is provided by the client in the first request for use by the data access device when determining a quantity of data to provide in the second response. Thus, a web cache can use the size of the current transmit window (e.g., TCP window) to determine how much data to send back to the client in one segment (e.g., TCP segment) to match the window size that the client has previously advertised (e.g., in a TCP segment sent from the client to the content switch).

In a further embodiment, the data access device is a first data access device (e.g., web cache), and the connection establishment information includes a location identifier (e.g., network address or URL) for a second data access device (e.g., web cache or server) suitable for use if a requested content specified in the first request is unavailable from the first data access device. Thus, if there is a cache miss and a web cache does not have the requested content, then the location identifier indicates another web cache or server that is likely to have the requested content.

In another embodiment, the connection establishment information is a first set of connection establishment information, and the data transfer approval includes a second set of connection establishment information. The data transfer approval authorizes the data access device to establish the communication connection to the client based on the first set and the second set of connection establishment information. For example, the data transfer approval can provide additional connection establishment information (e.g., for use over a TCP connection), such as the initial data sequence number for data transmitted to the client, and the initial acknowledgment sequence number to be sent to the client.

In an additional embodiment, the method includes receiving a first acknowledgment from the client of the second response provided to the client from the data access device over the communication connection, and in response to receiving the first acknowledgment, forwarding a second acknowledgment to the data access device indicating that the data communications device received the first acknowledgment from the client. Thus, the data communications device provides an acknowledgment, as an HUSP acknowledgment to the data access device, so that the data access device receives an acknowledgment of its response (e.g., HTTP response) to the client.

In a further embodiment, the method includes receiving a first termination signal from the data access device in order to terminate a request session with the client, and in response to receiving the first termination signal, providing a second termination signal to the client that indicates a request to terminate the request session.

In one embodiment, the invention is directed to a method, in a data access device (e.g., web cache) for providing data over a network to a client. The method includes receiving a second request to access data from a data communications device (e.g., content switch), providing a first response to the data communications device, and receiving a data transfer approval from the data communications device in response to providing the first response. The data transfer approval authorizes the data access device to establish the communication connection to the client and to provide a second response to the second request to the client based on the connection establishment information. The second request is based on a first request to access data received by the data communications device from the client. The second request includes connection establishment information that enables establishment of a communications connection between the data access device and the client. Thus the data access device can bypass the data communications device when sending the response to the client, and the response is not delayed by passing through the data communications device.

In another embodiment, the method includes receiving a content identifier that identifies a requested content and that enables the data access device to access the requested content. For example, a web cache receives a URL including a content identifier (e.g., for a file), and the web cache can use this information to identify the requested content.

In a further embodiment, the connection establishment information includes a current transmit window for the client that provides a window length for transmitting the second response to the client. The window length was provided by the client in the first request for use by the data access device when determining a quantity of data to provide in the second response. Thus, a web cache can provide the proper amount of data (i.e., not exceeding the client's advertised receive window size) when sending a response (e.g., HTTP response) to the client.

In another embodiment, the data access device is a first data access device, and the connection establishment information includes a location identifier for a second data access device suitable for use if a requested content specified in the first request is unavailable from the first data access device. Thus, if there is a cache miss and a web cache does not have the requested content, then the location identifier indicates another web cache or server that is likely to have the requested content.

In a further embodiment, the method includes establishing the communication connection to the client and providing the second response to the second request to the client over the communication connection.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a flow chart of a procedure for providing access to data in response to a client's request for content according to embodiments of the invention.

FIG. 2B is a flow chart of a procedure for providing data over a network to a client in response to a forwarded request originating from the client according to embodiments of the invention.

DETAILED DESCRIPTION

The invention is directed to techniques for forwarding a request initiated by a client from a content switch to a web cache (or other content delivery device) that provides the response to the client without passing through the switch. In the approach of the invention, the content switch uses a Heads Up Switching Protocol (HUSP) to forward the request to the web cache along with source and destination IP addresses, port information, sequence numbers, client window (e.g., TCP window for receiving data), and other related information, such as HTTP header information. The web cache can then use this information to return content to the client in an HUSP response that is sent to the client without passing through the switch. Thus, the content switch is not burdened with handling all of the responses, and the responses are not delayed due to passing through the content switch. In addition, the HUSP provides a request sequence number that facilitates returning responses from multiple requests by the client in the proper sequence. Thus, the client can provide multiple requests (i.e., pipelined requests) over the same connection to the content switch and receive responses directly from the web cache (or other content deliver device) in the same order that the requests were made, without requiring the client to wait until receiving the response to each request before sending another request.

Figure 1:
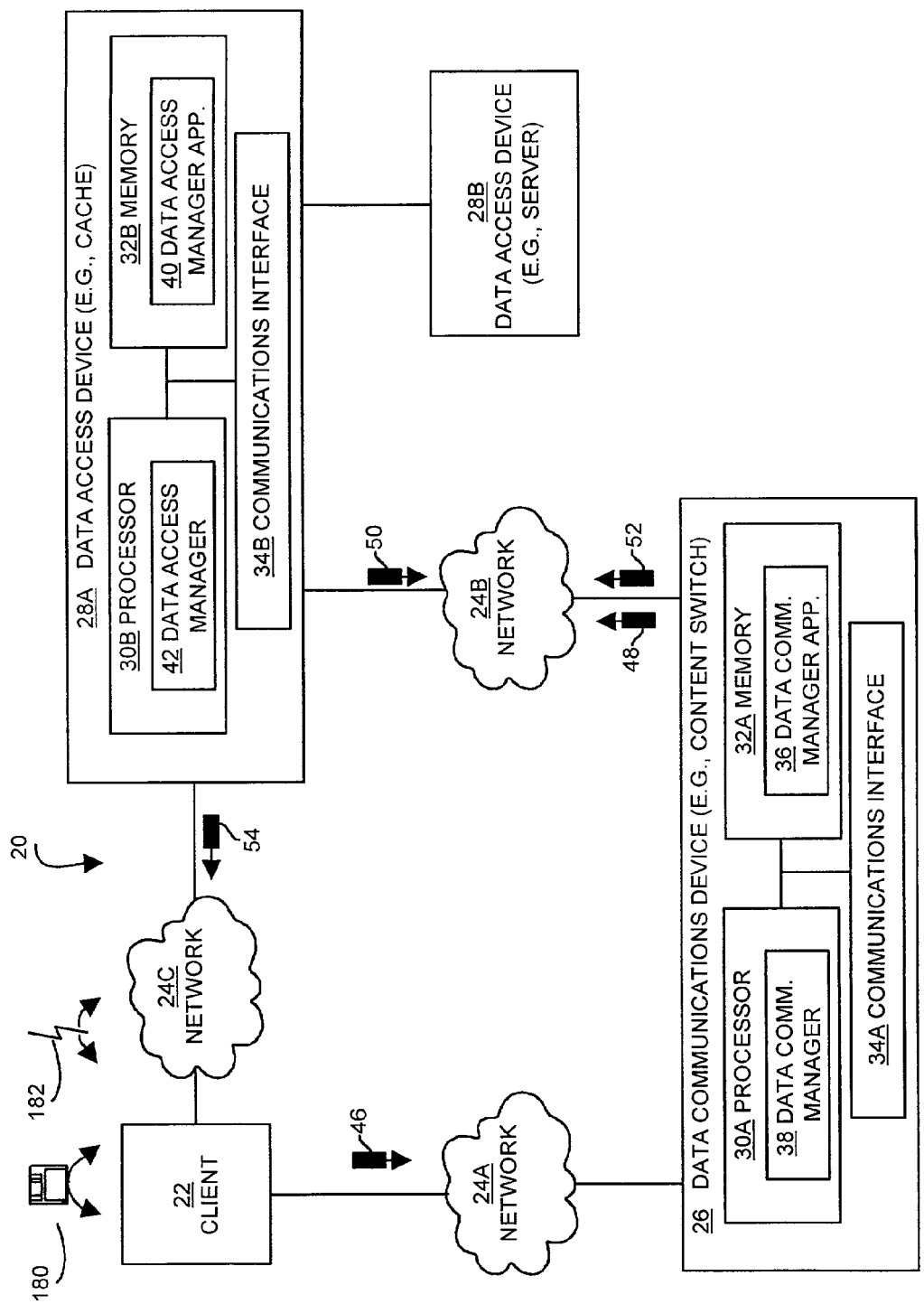
FIG. 1 is a block diagram of a network environment suitable for use with embodiments of the invention.

FIG. 1 is a block diagram of a network environment 20 suitable for use with embodiments of the invention, including a client 22, network 24 (e.g., 24A, 24B, and 24C), data communications device 26 (e.g., content switch), data access device 28A (e.g., web cache), and data access device 28B (e.g., server).

The client 22 is any type of suitable device that can generate a request signal 46 for content sent from the client 22 to the data communications device 26 and receive a content response signal 54 from a data access device 28. For example, the client 22 can be a desktop computer, a laptop computer, a palmtop computer, a communications device (e.g., mobile or cell phone), or other computing or electronic device capable of generating the content request signal 46, receiving the content response signal 54, and communicating over the network 24 (e.g., 24A and 24C).

The network 24 (e.g., 24A, 24B, 24C) is any type of network or communications connection capable of transmitting communications signals, such as request signal 46, forwarded request signal 48, initial response signal 50, data transfer approval signal 52, and content response signal 54. In one embodiment, the network 24 is a packet-based network, such as an IP network such as the Internet, operating over a transport protocol, such as TCP. In another embodiment, the network 24 is based on other protocols suitable for transmitting signals (e.g., 46, 48, 50, 52, and 54) and content (e.g., text, video, or other data), such as RTSP (real-time streaming protocol). In addition, all or part of the network 24 (e.g., network 24B) can be a wide area network (e.g., corporate wide area network or intranet). For example, the data access devices 28A, 28B can be part of a corporate network 24B with a firewall separating the corporate network 24B from the data communications device 26 and from the global Internet 24A, 24C and the client 22.

The data communications device 26 is any type of network or communications device suitable for receiving a request signal 46 from a client 22 and exchanging signals 48, 50, and 52 with the data access device 28A. For example, the data communications device 26 can be a network switch (e.g., content switch), network router, network bridge, computer, server, communications device, or other electronics device capable of data communications. The data communications device 26 includes a processor 30A (e.g., microprocessor), memory 32A (e.g., volatile memory such as random access memory or RAM, and optionally nonvolatile memory such as a disk), and a communications interface 34A (e.g., interface to the Internet or other network). The memory 32A encodes logic instructions for a data communication manager application 36 that, when performing on the processor 30A, form a data communication manager 38 that manages the processing and communication of signals 46, 48, 50, 52.

The data access device 28 (e.g., 28A and 28B) is any type of data storage device suitable for receiving a request for data and providing a response. The data access device 28A is a device suitable for receiving a forwarded request signal 48 from the data communication device 26 and exchanging signals 50, and 52 with the data communications device 26. The data access device 28 (e.g., 28A and 28B) can be a web cache, a web server, a data storage device, a switch with a cache, a router with a cache, or other networked electronics device that stores data or has access to a data storage device (e.g., a disk closely connected to the data access device 28). The data communications device 26 includes a processor 30B (e.g., microprocessor), memory 32B (e.g., volatile memory such as random access memory or RAM, and optionally nonvolatile memory such as a disk), and a communications interface 34B (e.g., interface to the Internet or other network). The memory 32B encodes logic instructions for a data access manager application 40 that, when performing on the processor 30B, form a data access manager 42 that manages access to data stored on the data access devices 28A and/or 28B. In one embodiment, the data access device 28B is a web or origin server storing an original or master version of data all or part of which is provided to the data access device 28A, which serves as a web cache. In another embodiment, the data access devices 28A and 28B can be connected to each other by a direct connection (e.g., fibre channel or other channel connection) or a local area network (e.g., Ethernet) providing for a relatively high speed communications between the data access device 28A and data access device 28B.

In one embodiment, a computer program product 180 including a computer readable medium (e.g., one or more CDROM's, diskettes, tapes, etc.) provides software instructions (e.g., data communication manager application 36) for the data communications manager 38 and/or software instructions (e.g., data access manager application 40) for the data access manager 42. The computer program product 180 can be installed by any suitable software installation procedure, as is well known in the art. In another embodiment, the software instructions can also be downloaded over a wireless connection. A computer program propagated signal product 182 embodied on a propagated signal on a propagation medium (e.g., a radio wave, an infrared wave, a laser wave, sound wave, or an electrical wave propagated over the Internet or other network) provides software instructions for the data communication manager 38 and/or the data access manager 42. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 180 is a propagation medium that the computer can receive and read, such as by receiving the propagation medium and identifying a propagated signal embodied in the propagation medium, as described above for the computer program propagated signal product 182.

In a general summary of the operation of the invention, the client 22 provides a request signal 46 to the data communications device 26 (e.g., content switch). The data communications device 26 then provides a forwarded request signal 48 to the data access device 28A (e.g., web cache). The data access device 28A responds with an initial response signal 50 to the data communications device 26 (e.g., indicating that the data access device 28A has access to the content requested in the forwarded request 48). The data communications device 26 then provides an approval signal 52 to the data access device 28A that approves the transfer of the data from the data access device 28A to the client 22. The data access device 28A obtains the requested data (e.g., from its own data storage or from a server 28B) and sends the requested data in a content response signal 54 to the client 22.

FIG. 2A is a flow chart of a procedure 100 for providing access to data in response to a client's request 46 for content according to embodiments of the invention.

In step 102, the data communications device 26 (e.g., content switch) receives an initial request signal 46 from a client 22 to access content. For example, the client 22 requests content (e.g., video, text, graphics, data, or other content) from a content switch 26, which evaluates the request signal 46 and determines a web cache (e.g., 28A) that may be able to provide the content requested in the request 46.

In step 104, the data communications device 26 provides a forwarded request signal 48 to the data access device 28A (e.g., web cache) in response to the initial request signal 46 from the client. For example, the content switch (e.g., 26) provides a forwarded request signal 48 that includes a request for the content identified in the initial request signal 46. In a particular example, the content switch 26 sends the forwarded request signal 48 over a network connection through a firewall to a wide area network or intranet that connects to the web cache 28A. The forwarded request 48 includes connection establishment information that enables establishment of a communications connection between the data access device 28A and the client 22. For example, the connection establishment information includes information on the network address of the client 22, amount of data that the client can receive at one time (e.g., data window), and other relevant information (e.g., TCP sequence and acknowledgment numbers). When the data access device 26 is ready to return the requested content to the client 22 in a content response signal 54, the data access device 26 can use the connection establishment information to establish the communication connection between the data access device 26 and the client 22 and then provide the content response signal 54 over the communications connection. In one embodiment, the communication connection is based on a transaction TCP (T/TCP) connection, as described in RFC 1644 from the Internet Engineering Task Force, entitled "T/TCP—TCP Extensions for Transactions Functional Specification," the disclosure of which is hereby incorporated herein in its entirety. In general, any or all of the signals 46, 48, 50, 52 and 54 can be based on a transaction TCP (T/TCP) connection.

In step 106, the data communications device 26 receives an initial response signal 50 from the data access device 28A. For example, the content switch 26 receives the initial response signal 50 that indicates that the web cache 28A has access to the requested content. In particular, the web cache 28A can provide the requested content from a cache of data stored in the memory 32B of the web cache 28A or the web cache 28A can fulfill the forwarded request signal 48 by obtaining the requested content from a server 28B (e.g., origin server that has an original or master version of the content).

In step 108, the data communications device 26 provides a data transfer approval signal 52 to the data access device 28A based on the initial response 48 from the data access device

28A. The data transfer approval signal 52 authorizes the data access device 28A to provide a content response 54 to the client 22 based on the connection establishment information. For example, a web cache 28A establishes a connection (e.g., TCP connection) to the client 22 and provides the requested content in the content response 54 sent over the connection to the client 22. In a particular example, the web cache 28A sends the content response 54 from a wide area network or intranet 24C through a firewall to the client 22.

FIG. 2B is a flow chart of a procedure 120 for providing data over a network 24 to a client 22 in response to a forwarded request 48 originating from the client 22 according to embodiments of the invention.

In step 122, the data access device 28A receives a forwarded request signal 48 from the data communications device 26 over the network 24B in response to the initial request signal 46 sent to the data communications device 26 from the client 22 over the network 24A. The forwarded request signal 48 includes connection establishment information, as described earlier, that enables the establishment of a communications connection between the data access device 28A and the client 22. For example, a web cache 28A receives the forwarded request signal 48 through a firewall to a wide area network or intranet from the web switch 26.

In step 124, the data access device 28A provides an initial response signal 50 to the data communications device 26. For example, a web cache 28A provides the initial response through a wide area network or intranet and firewall to the content switch 26.

In step 126, the data access device 28A receives a data transfer approval signal 52 from the data communications device 26 based on the initial response signal 50 from the data access device 28A. The data transfer approval signal 50 authorizes the data access device 28A to provide a content response signal 54 to the client 22 based on the connection establishment information received in step 122 in the forwarded request 48 from the data communications device 26. For example, the data transfer approval signal 50 authorizes the web cache 28A to provide a content response signal 54 from a wide area network or intranet 24C through a firewall to the client 22.

Figure 3A:
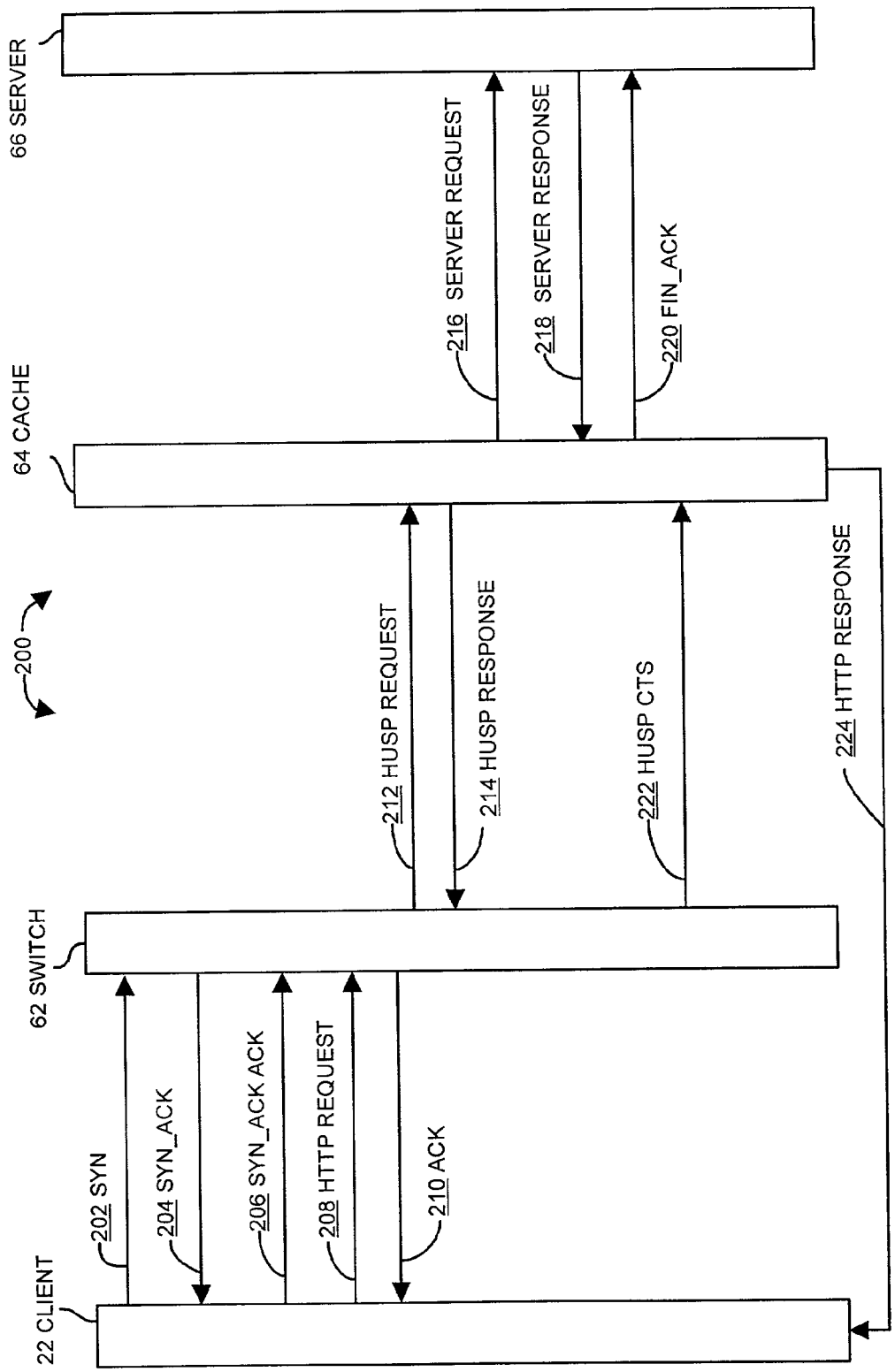
FIGS. 3A and 3B are a block diagrams of a communications environment illustrating an example of an exchange of signals providing a response from a web cache to a request for content from a client.
Figure 3B:
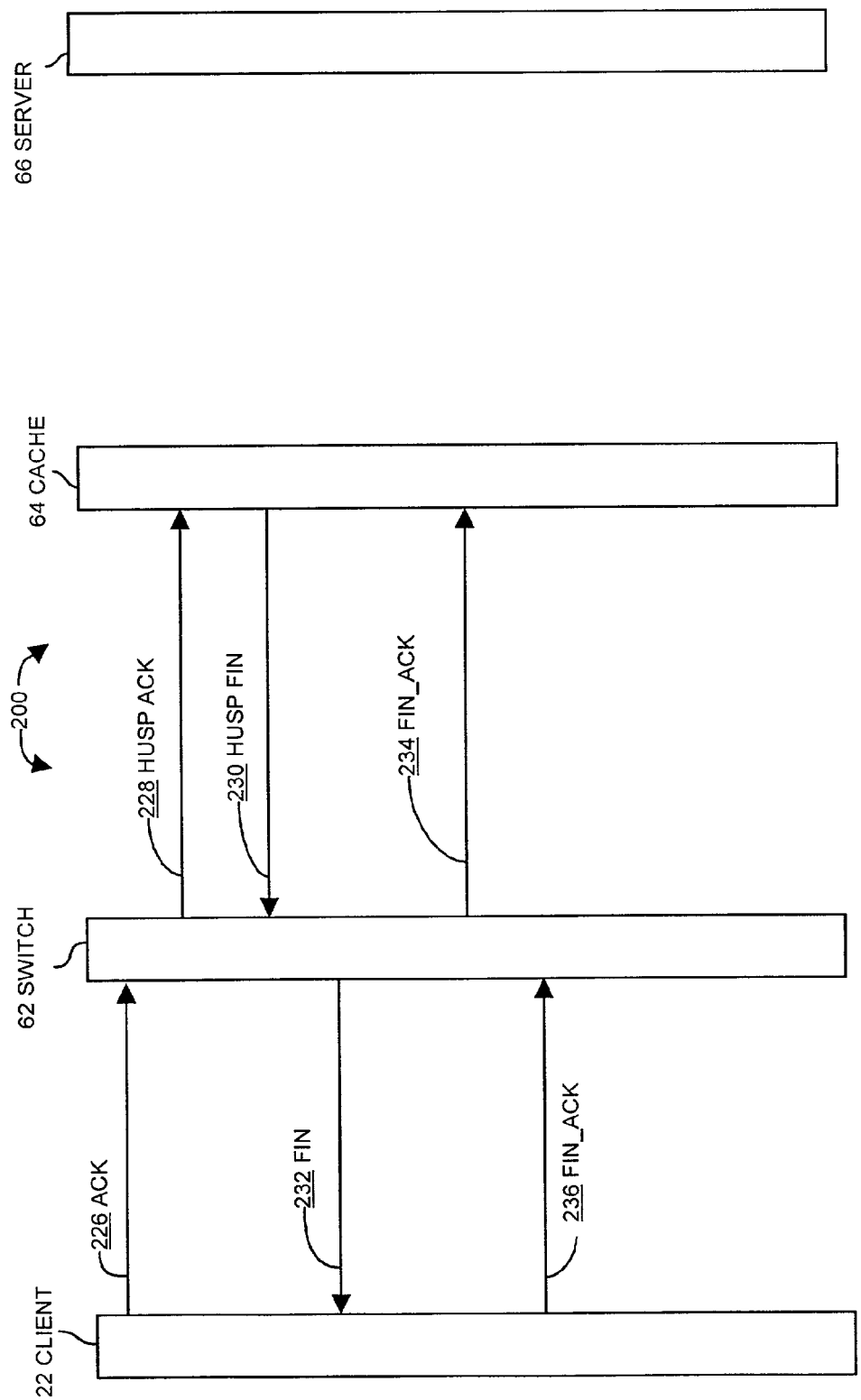

FIGS. 3A and 3B are a block diagrams of a communications environment 200 illustrating an example of an exchange of signals 202 through 236 providing a response from a web cache to a request for content from a client 22. The communications environment 200 includes a client 22, a switch 62 (e.g., network content switch), a cache 64 (e.g., web cache), and a server 66. The switch 62 is one example of the data communications device 26 illustrated in FIG. 1. The cache 64 is one example of the data access device 28A illustrated in FIG. 1. The server 66 is one example of the data access device 28B illustrated in FIG. 1. The signals 202 through 236 are described below, and their use is discussed in more detail for the flow chart in the next figure, FIG. 4.

FIG. 3A illustrates signals 202 through 224. The client 22 and the switch 62 exchange the SYN signal 202 (e.g., TCP synchronize segment), the SYN_ACK signal 204 (e.g., TCP acknowledgment segment), the SYN_ACK ACK signal 206 (e.g., TCP acknowledgment segment), the HTTP request 208, and the ACK signal 210 (e.g., TCP acknowledgment segment). The HTTP request 208 is one example of the content request 46 illustrated in FIG. 1. In one embodiment, the HUSP signals 212, 214, 222, 224, 228, and 230 are tunneled signals (i.e., they wrap one protocol inside of another protocol). The HUSP signals 212, 214, 222, 224, 228, and 230 are constructed as a connection tunnel in contrast to packet tunnels for other protocols (e.g., TCP). The tunnel envelope information is exchanged at the creation and termination of the connection, and not for every packet. In one embodiment, the HUSP signals 212, 214, 222, 224, 228, and 230 are based on a transaction-based protocol, such as T/TCP.

The HUSP request signal 212 and the HUSP response signal 214 are HUSP signals exchanged by the switch 62 and the cache 64. The HUSP request signal 212 is one example of the forwarded request 48 illustrated in FIG. 1. In one embodiment, the HUSP request signal 212 includes an HUSP header followed by the full HTTP request that was sent in the HTTP request signal 208. The HUSP request signal 212 includes the tunneled TCP/UDP source port (e.g., TCP or User Datagram Protocol port of the client 22), the tunneled TCP/UDP destination port (e.g., TCP or UDP port of the switch 62), the tunneled IP source address (e.g., IP address of the client 22), the tunneled IP destination address (e.g., IP address of the switch 62), maximum receive window (e.g., last receive window that the switch 62 advertised), maximum transmit window (e.g., window for transmitting data to the client 22), timestamp (e.g., for measuring round-trip time), REQ sequence (e.g., request sequence number used to match HUSP CTS to this HUSP REQ), server IP address (e.g., if server, should be used to serve a cache miss) and other fields, as described in Appendix A. With regard to the request sequence, each request in an HTTP pipeline of requests is assigned a unique REQ or request sequence number. All HUSP packets associated with that request contain the same number. In addition the HUSP request signal 212 includes information (e.g., content identifier) from the HTTP request signal 208 identifying the content being requested by the client 22 that is introduced in the HUSP request signal 212 by a HUSP HTTP header, as described in Appendix A.

In one embodiment, the HUSP request signal 212 includes connection establishment information that enables a connection between the cache 64 and the client 22, which is represented by the tunneled TCP/UDP source port of the client, the tunneled IP source address of the client, and maximum transmit or receive window for the client 22. In one embodiment, the HUSP request signal 212 includes additional connection establishment information, such as an initial data sequence number for data transmitted to client and initial ACK sequence number to be sent to the client. In another embodiment, the HUSP CTS signal 222 includes the additional connection establishment information, such as the initial data sequence number for data transmitted to client and the initial ACK sequence number to be sent to the client.

The HUSP response signal 214 is one example of the initial response signal 50 illustrated in FIG. 1. The HUSP response signal 214 includes the tunneled TCP/UDP source port (e.g., TCP or UDP port of the client 22), the tunneled TCP/UDP destination port (e.g., TCP or UDP port of the server 66), the tunneled IP source address (e.g., IP address of the client 22), the tunneled IP destination address (e.g., IP address of the server 66), timestamp (e.g., for measuring round trip time), REQ sequence (e.g., request sequence number used to match HUSP CTS to this HUSP response), and other fields, as described in Appendix A.

The server request signal 216, the server response signal 218, and FIN_ACK signal 220 (e.g., TCP segment) are signals exchanged by the cache 64 and the server 66. In one embodiment, the server request signal 216 and the server response signal 218 are implemented in any suitable request/response protocol, such as HTTP over TCP/IP or an Internet content routing protocol. In another embodiment, the server request signal 216 and the server response signal 218 are implemented in a suitable transaction-based protocol, such as T/TCP. In a further embodiment, the server request signal 216 and the server response signal 218 are implemented in the HUSP.

HUSP CTS signal 222 is a clear to send signal provided by the switch 62 to the server 66. The HUSP CTS signal 222 is one example of the data transfer approval signal 52 of FIG. 1. The HUSP CTS signal 222 includes the request sequence number, the data sequence number (e.g., initial sequence number for data transmitted to client), ACK sequence (e.g., initial ACK sequence number to be sent to client, and current transmit window (e.g., the most recently advertised receive window of the client 22), as described in Appendix A.

The HTTP response signal 224 is an HTTP response from the cache 64 to the client 22. The HTTP response signal 224 is one example of the content response signal 54 illustrated in FIG. 1. The HTTP response signal 224 provides the content identified by a content identifier included in the HUSP request signal 212, which is indicated by the content indicated by the client 22 in the HTTP request signal 224. In general, the content identifier is any type of identifier (e.g., data or text string) that serves to identify content that can be requested over a network (e.g., text, data, video, audio, graphic, or other type of content). The content identifier can be based on a server name, script or program providing the content, Uniform Resource Locator or URL, query string, or other name or identifier that can be used to determine the identity of requested content.

FIG. 3B illustrates signals 226 through 236. The ACK signal 226, FIN signal 232, and FIN_ACK signal 236 are signals exchanged between the client 22 and the switch 62. For example, these signals 226, 232, and 236 are TCP (or T/TCP) signals transmitted over a TCP (or T/TCP) connection.

The HUSP ACK signal 228, the HUSP FIN signal 230, and FIN_ACK signal 234 are signals exchanged between the switch 62 and the cache 64. The HUSP ACK signal 228 includes a REQ sequence (e.g., request sequence number indicating which HUSP request 212 that the HUSP ACK 228 is related to), a current transmit window (e.g., most recently advertised receive window of the client 22), data sequence number (e.g., with a value of 0), ACK sequence (e.g., latest ACK sequence number, such as a TCP ACK sequence number, to send to the client 22), and other fields, as described in Appendix A. The HUSP FIN signal 230 includes a REQ sequence (e.g., request sequence number indicating which HUSP request 212 that the HUSP ACK 228 is related to), a current transmit window (e.g., with a value of 0), data sequence (e.g., data sequence number of last data byte transmitted to the client), ACK sequence (e.g., latest ACK sequence number, such as a TCP ACK sequence number, transmitted by the cache 64 to the client 22), and other fields, as described in Appendix A.

Figure 4:
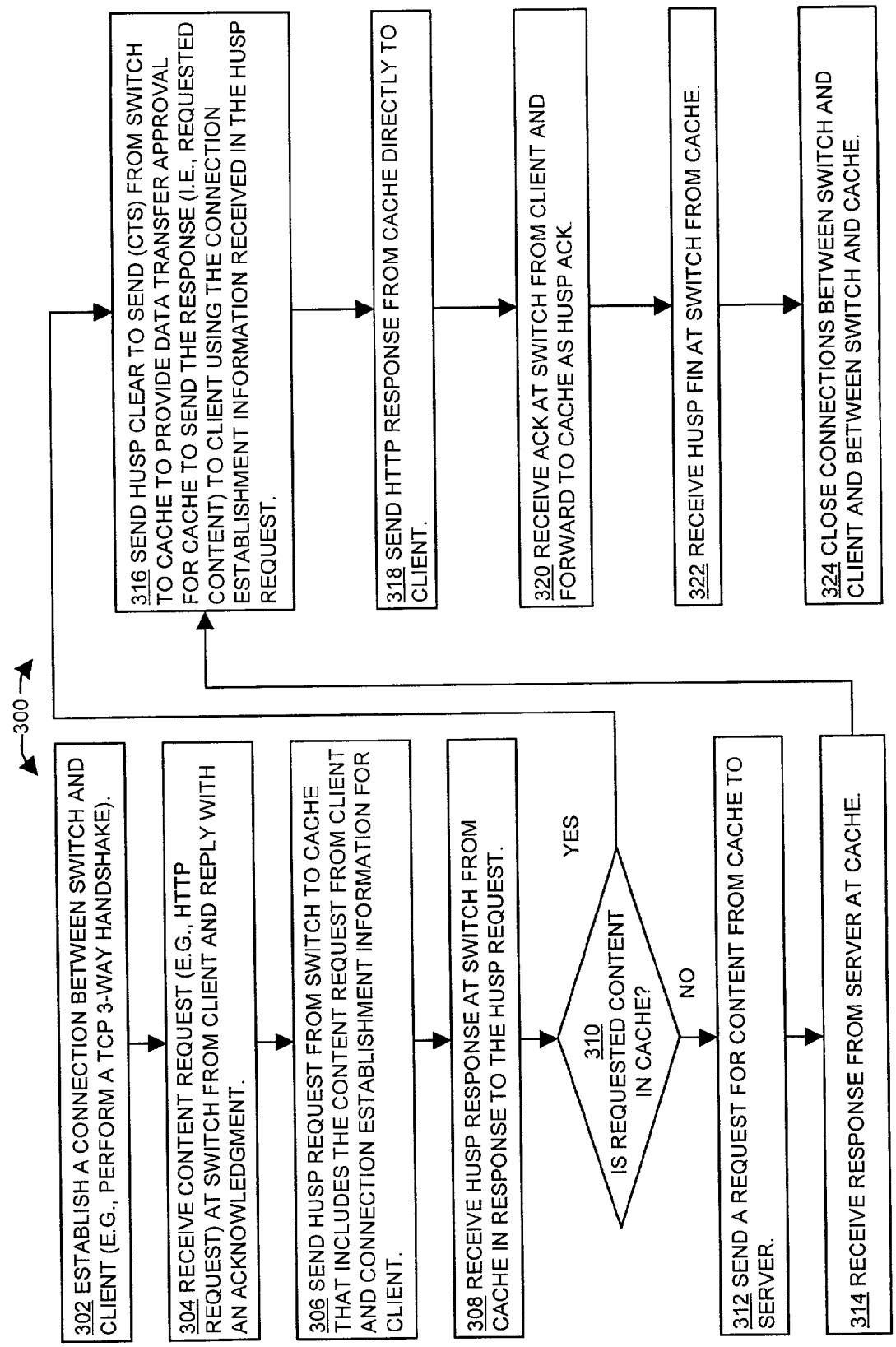
FIG. 4 is a flow chart of a procedure for providing a response to a client's request for the embodiments of the invention illustrated in FIGS. 3A and 3B.

FIG. 4 is a flow chart of a procedure 300 for providing a response 224 to a client's request 208 for the embodiments of the invention illustrated in FIGS. 3A and 3B.

In step 302, the switch 62 establishes a connection between the switch 62 and the client 22. For example, the client 22 and the switch 62 perform a TCP 3-way handshake, by the exchange of the SYN signal 202, SYN_ACK signal 204, and SYN_ACK ACK signal 206.

In step 304, the switch 62 receives the HTTP request signal 208 from the client 22 and replies with an ACK signal 210. For example, the HTTP request signal 208 is a request from the client 22 for content, such as indicated by a content identifier (e.g., URL) in the HTTP request. In one embodiment, the HTTP request signal 208 includes a typical HTTP request, and no modification of the HTTP is required. After sending sufficient acknowledgments to receive the first request (i.e., if more than one ACK signal 210 is required), the switch 62 does not send any subsequent acknowledgments to the client 22. Rather, the responsibility for sending acknowledgments is transferred to the cache 64 that will provide the HTTP response signal 224 (or multiple HTTP response signals 224 to complete transmission of the requested data). This transfer allows the acknowledgments to be included with the transmitted data in the HTTP response signal(s) 224, and eliminates any problems of multiple acknowledgment streams from both a switch 62 and a cache 64.

In step 306, the switch 62 sends a HUSP request signal 212 from the switch 62 to the cache 64 that includes information from the content request or HTTP request signal 208 from the client 22 (i.e., content identifier) and connection establishment information for the client 22 that will enable the cache 64 to form a connection with the client 22 at a later point in time (see steps 316 and 318). In one embodiment, additional connection establishment information in transmitted in the HUSP CTS signal 222 at a later time (see step 316), including the initial data sequence number for data transmitted to client and the initial ACK sequence number to be sent to the client. In one example of sending requests, the switch 62 can send the HUSP request signal 212 to multiple caches 64 in a bidding process as described below, who will then reply with a HUSP response signal 214 from each cache 64 (see step 308). However, no cache 64 will send data to the client 22, which could otherwise be overloaded with multiple responses 224, until receiving a HUSP CTS signal 222 (see step 316). In another embodiment, the HUSP requests signal 212 includes a server IP address, which indicates the IP address of a server 66 or cache 64 to use if there is a cache miss (i.e., the cache 64 receiving the HUSP request signal 212 does not have the requested content).

In one embodiment, the switch 62 performs the bidding process with one or more caches 64 by sending one or more HUSP request signals 212 to the caches 64. Each cache 64 can respond with a bid including load information (e.g., usage information and usage level) and an estimate of the cost of handling the request 212. Such a bidding process can proceed in a serial or parallel manner.

In step 308, the switch 62 receives the HUSP response signal 214 from the cache 64 in response to the HUSP request signal 212. The HUSP response signal 214 includes enough information for the switch 62 to make decisions about load balancing among two or more caches 64. For example, the HUSP response signal 214 may include usage information (e.g., in a bid) for each cache 64 that indicates how busy or heavily loaded that cache 64 is, as well as other information such as a cost estimate. In particular, the HUSP response signal 214 may include level of usage or usage metric for each cache 64. The switch 62 can then compare the usage levels to determine which cache 64 has a preferable usage level, such as the lowest usage level for a group or subset of caches 64 that received HUSP requests 212 from the switch 62. The switch 62 can also consider other factors in selecting a cache 64, such as the estimated cost of handling the request, the type of content provided by a cache 64, its geographical distance from the client 22, its network distance (e.g., number of hops) from the client 22, and other factors. Thus the switch 62 can select a specific cache 64 from several caches 64 that the switch 62 send HUSP request signals 212.

In step 310, the switch 62 determines if the requested content is in the cache 64 that provided the HUSP response signal 214. For example, the cache 64 has indicated that it has access to the requested content in the HUSP response signal 214. If the requested content is available in storage on the cache 64 (or from a disk closely coupled to the cache 64), the cache 64 proceeds to step 316. If the requested content is not available (i.e., this is a cache miss) but is available from a server 66, then the cache 64 proceeds to step 312.

In step 312, the cache 64 sends a request for content 216 to the server 66. For example, the server 66 stores a master, original, or complete copy of a set of content (e.g., library of video data) and can provide the requested content (e.g., video clip) to the cache 64. The server 66 that has the content may be indicated in a server IP address field of the HUSP request signal 212 that has a location identifier that identifies the server 66 (e.g., IP address).

In step 314, the cache 64 receives a response signal 216 from the server 66 in response to the request 216. The response signal 216 provides the content identified in the HUSP request 212 (see step 306). The cache 64 then responds with a FIN_ACK signal 220 to indicate that the cache 64 received the response signal 216 and to terminate the connection (e.g., TCP connection) between the cache 64 and the server 66.

In step 316, the switch 62 sends a HUSP CTS (clear to send) signal 222 to the cache 64 to provide data transfer approval for the cache 64 to send the HTTP response signal 224 (i.e., requested content) to the client 22 using the connection establishment information received in the HUSP request signal 212. In one embodiment, the HUSP CTS signal 222 provides additional connection establishment information, such as the data sequence number and acknowledgment sequence number (e.g., TCP sequence and acknowledgment numbers) to use when establishing the connection between the cache 64 and the client 22. For example, if the switch 62 sent out HUSP request signals 212 to multiple caches 64 in a bidding process as described earlier, then the switch 62 can select the cache 64 that is preferable (e.g., for load balancing among several caches 64, for a cache 64 that indicates that it has the requested content, or for other reasons) to receive the HUSP CTS signal 222. In addition, the switch 62 can send pipelined requests 212 (i.e., multiple requests 212 in a sequence) to one or more caches 64. The switch 62 relies on the request sequence numbers in the HUSP request signal 212, HUSP response signal 214, and HUSP CTS signal 222 to keep track of the sequence of the HUSP request signals 212 and approve the transmission of data back to the client 22 in sequence. Thus, if the client 22 makes several pipelined HTTP requests 208 to the switch 62, the switch 62 then uses the request sequence numbers to determine when and to which cache 64 to send the HUSP CTS signal 222 so that the client 22 can receive the HTTP response signals 224 from the cache 64 in an order corresponding to the order of the HTTP requests 208 from the client 22. Thus, the approach of the invention can handle pipelined requests in an efficient and accurate manner to avoid the problem of the client 22 receiving HTTP response signals 224 that are not in sequence with the HTTP request signals 208 from the client 22.

In step 318, the cache 64 sends the HTTP response 224 to the client 22. The cache 64 uses the connection establishment information received in the HUSP request 212 and the HUSP CTS 222, such as IP address of the client 22, port number to use at the client 22, and sequence number (e.g., TCP sequence number), to establish a network connection (e.g., TCP connection) with the client 22. Then, the cache 64 sends the HTTP response to the client 22 over the network connection.

In step 320, the switch 62 receives an ACK signal 226 (see FIG. 3B) from the client 22 and forwards the acknowledgment to the cache 64 as a HUSP ACK signal 228. The switch 62 places the acknowledgment sequence numbers and window size (e.g., current transmit window) of the client 22 into the HUSP ACK signal 228. In a request pipeline situation, multiple HUSP ACK signals 228 reflect the HTTP requests 208 (e.g., GET requests) received from the client 22 after the initial HTTP request 208. Thus, there will only be one acknowledgment stream from the switch 62 and cache 64 to the client 22 at any one point in time.

In step 322, the switch 62 received a HUSP FIN signal 230 from the cache 64. If there is only one HTTP request 208, then the HUSP FIN signal 230 causes the switch 62 to send a FIN signal 232 (e.g., TCP FIN) to the client 22. The HUSP FIN signal 230 contains the final sequence number for data transmitted from the cache 64 to the client 22. If there is a pipeline of HTTP requests 208, then the switch 62 responds to the HUSP FIN signal 230 from the cache 64 by issuing a HUSP CTS signal 222 to the cache 64 that can respond to the next request (i.e., next HTTP request 208 as forwarded to that cache 64 in a HUSP request 212). Thus, the client 22 receives HTTP response signals 224 in an order corresponding to the order of the HTTP request signals 208 that the client 22 sent to the switch 62. In other words, the HUSP FIN signal 230 operates as a transmit permission signal sent back from the cache 64 to the switch 62 after the cache has completed sending a response to the client 22. The HUSP FIN signal 230 indicates to the switch that the request is finished. The switch 62 can then either send the next HUCP CTS in the sequence to begin transmission of the next response to the client 22, or it can send a FIN (see step 324 below) to the client 22 if all pending requests are complete and the client has sent a FIN to the switch, or, the switch can wait for another client request to arrive or for a FIN to arrive from the client.

In step 324, the switch 62 and the client 22 close the connection between them, and the cache 64 and the switch 62 close their connection. This closure is accomplished by the exchange of FIN signal 232, FIN_ACK signal 234, and FIN_ACK signal 236, as shown in FIG. 3B.

The approach of the invention can be used with a same click failover approach to responding to a failure of a cache 64. The same click failover approach means continuing to deliver data to the same client connection but from a different cache 64. For example, if a switch 62 stopped receiving acknowledgments from a client 22 during data transfer from a cache 64, the switch 62 can determine if the cache 64 is still available. If not available, the switch 62 can send an HUSP failover signal to a backup cache 64 (or server 66), which can resume delivery of the requested content from the last acknowledged byte.

In a sense, the cache then takes responsibility for only half of a TCP connection extending to/from a client to a web site facility (e.g., a conglomeration of switches, caches and web servers). All packets sent by the client still arrive first at a switch. However, the cache then, using the techniques described above, takes temporary responsibility for transmitting all packets back to the client related to the response.

The techniques of the invention can be implemented in a variety of data communication devices, including network switches, routers, bridges, and other data communication devices. For example, the techniques of the invention can be implemented within a network flow switch 26 as described according to commonly assigned U.S. Pat. No. 6,006,264, entitled "Method and System for Directing a Flow between a Client and a Server," the teachings of which are hereby incorporated by reference in their entirety. This patent application discloses a content-aware flow switch (i.e., flow switch) 26 that intercepts a client request 46 (e.g., HTTP content request) and directs the request 46 to the server 28 that is most suitable for the request. The flow switch 26 chooses the server 28 depending on the type of content requested, the quality of service requirements implied in the request, the level of network congestion, and the proximity of the client 22 to the available servers 28. If a server 28 is not available to service the request from a client 22, then the flow switch 26 instructs the client 22 to redirect the request (e.g., make a new connection and HTTP request) to another server 28 to service the request.

Using the approach of the invention, the flow switch 26 of U.S. Pat. No. 6,006,264 can be used to choose a data access device 28 (e.g., web cache) to respond to the request 46 and forward the request 46 as a forwarded request 48 to the selected data access device 28 (e.g., web cache) to respond to the request 48 with an exchange of signals 48, 50, 52, and 54 (see FIG. 1) as described herein.

In a summary of the operation of the invention, the client 22 provides a request 46 (e.g., HTTP request) to the data communications device 26 (e.g., content switch), which sends a forwarded request 48 based on the request 46 to the data access device 28A (e.g., web cache). If need be, the data access device 28A obtains the requested content from another data access device 28B (e.g., server). The data access device 28A provides an initial response 50 to the data communications device 26 (e.g., indicating that the requested content is available and, optionally, providing usage information, cost estimates and/or other information). The data communications device 26 provides a data transfer approval signal 52 to the data access device 28A that indicates that the data access device 28A is to provide the requested content to the client 22. The data access device 28A establishes a connection with the client 22 without using the data communications device 26 because the data access device 28A received connection establishment information from the data communications device 26 and then provides the requested content to the client 22 over the connection. For example, the connection establishment information includes the IP address for the client 22, the port number for the client 22, and the current window size for the client 22 to receive data, as well as other relevant information, provided in signals from the data communications device 26, such as the forwarded request 48 and/or data transfer approval 52 signals.

While this invention has been particularly shown and described with references to preferred embodiments thereof, it will be understood by those skilled in the art that various changes in form and details may be made therein without departing from the spirit and scope of the invention as defined by the claims that follow Appendix A.

For example, the network 24 can be a different type of network for each network 24A, 24B, and 24C shown in FIG. 1. The network 24A providing connections between the client 22 and the data communications device 26 can be a global Internet network, while the network 24B providing connections between the data communications device 26 and the data access device 26A can be a local area network (e.g., Ethernet). Each network 24A, 24B, and 24C can be based on different physical connections, such as a modem connections, a cable connection, channel connection, or other connection.

In addition, the connection establishment information used by a data access device 28 to establish a connection with a client 22 can be provided by any one, or any combination, of the HUSP signals (e.g., HUSP request 212, HUSP CTS 222, HUSP ACK 228), including other HUSP signals, such as an HUSP connection establishment information signal.

APPENDIX A

Heads Up Switching Protocol Packet Design

| SECTION | FIELD | LENGTH | COMMENTS |
|---|---|---|---|
| | HUSP REQ | | |
| IP header | Version | 4 bits | |
| | Header length | 4 bits | |
| | TOS | 1 byte | |
| | Total length | 2 bytes | |
| | Ident | 2 bytes | |
| | Flags | 3 bits | |
| | Fragment offset | 13 bits | |
| | TTL | 1 byte | |
| | Protocol | 1 byte | |
| | Header checksum | 2 bytes | |
| | Source IP address | 4 bytes | Switch address |
| | Destination IP address | 4 bytes | Cache address |
| IP options | | | None required |
| TCP header | Source port | 2 bytes | Switch port |
| | Destination port | 2 bytes | Cache port (HUSP configured port) |
| | Data sequence number | 4 bytes | |
| | Ack sequence number | 4 bytes | |
| | Data offset | 4 bits | |
| | Unused | 4 bits | |
| | Bits | 8 bits | SYN/PSH |
| | Window | 2 bytes | |
| | Checksum | 2 bytes | |
| | Out of band data pointer | 2 bytes | |

APPENDIX A-continued

Heads Up Switching Protocol Packet Design

| SECTION | FIELD | LENGTH | COMMENTS |
|---|---|---|---|
| TCP options | | | None required |
| HUSP header | Length | 2 bytes | size of HUSP header in bytes |
| | Version | 1 byte | Val = 1 |
| | Type | 1 byte | Val = 3 |
| | Tunneled TCP/UDP source port | 2 bytes | Client's TCP port |
| | Tunneled TCP/UDP destination port | 2 bytes | Switch's TCP port (typically port 80 for HTTP) |
| | Tunneled IP source address | 4 bytes | Client's IP address |
| | Tunneled IP destination address | 4 bytes | Switch's IP address |
| | Maximum receive window | 2 bytes | Last receive window that the switch advertised. Becomes the cache's receive window |
| | Maximum transmit window | 2 bytes | Client's receive window |
| | Timestamp | 4 bytes | For measuring round-trip time |
| | Domain hash | 8 bytes | |
| | URL hash | 8 bytes | |
| | MIME code | 2 bytes | |
| | Unused | 4 bits | |
| | REQ sequence | 12 bits | Matches HUSP CTS to this HUSP REQ. Starting at 1, each request in an HTTP pipeline is assigned a umque REQ sequence number. All HUSP packets associated with that request contain the same number. |
| | Server IP address | 4 bytes | If non-zero, should be used to serve a cache miss. |
| HUSP HTTP header | Human language | 2 bytes | Perhaps Eflags instead? |
| | Request type | 2 bytes | GET = 1, PUT = 2, . . . |
| | HTTP header length | 2 bytes | Length in bytes of the HTTP header |
| | Unused | 1 byte | |
| | HTTP header parse array length | 1 byte | Number of elements in parse array, zero if none |
| | HTTP header parse array | N * 2 bytes | Array of offsets to important fields in the HTTP header. |
| HTTP header | ASCII Text | HTTP header length | As much as will fit in MTU. The rest of the header will appear in subsequent packets. |
| | | HUSP RESP | |
| IP header | version | 4 bits | |
| | Header length | 4 bits | |
| | TOS | 1 byte | |
| | Total length | 2 bytes | |
| | Ident | 2 bytes | |
| | Flags | 3 bits | |
| | Fragment offset | 13 bits | |
| | TTL | 1 byte | |
| | Protocol | 1 byte | |
| | Header checksum | 2 bytes | |
| | Source IP address | 4 bytes | Cache address |
| | Destination IP address | 4 bytes | Switch address |

APPENDIX A-continued

Heads Up Switching Protocol Packet Design

| SECTION | FIELD | LENGTH | COMMENTS |
|---|---|---|---|
| IP options | | | None required |
| TCP header | Source port | 2 bytes | Cache port (HUSP configured port) |
| | Destination port | 2 bytes | Switch port |
| | Data sequence number | 4 bytes | |
| | Ack sequence number | 4 bytes | |
| | Data offset | 4 bits | |
| | Unused | 4 bits | |
| | Bits | 8 bits | SYN/ACK/PSH |
| | Window | 2 bytes | |
| | Checksum | 2 bytes | |
| | Out of band data pointer | 2 bytes | |
| TCP options | | | None required |
| HUSP header | Length | 2 bytes | |
| | Version | 1 byte | Val = 1 |
| | Type | 1 byte | Val = 4 |
| | Tunneled TCP/UDP source port | 2 bytes | Client's TCP port |
| | Tunneled TCP/UDP destination port | 2 bytes | Server's TCP port (usually 80 for HTTP) |
| | Tunneled IP source address | 4 bytes | Client's IP address |
| | Tunneled IP destination address | 4 bytes | Server's IP address |
| | Timestamp | 4 bytes | For measuring round-trip time |
| | Unused | 4 bits | |
| | REQ sequence | 12 bits | Matches HUSP CTS to this HUSP RESP |
| | Available capacity | 4 bytes | |
| | HUSP CTS | | |
| IP header | version | 4 bits | |
| | Header length | 4 bits | |
| | TOS | 1 byte | |
| | Total length | 2 bytes | |
| | Ident | 2 bytes | |
| | Flags | 3 bits | |
| | Fragment offset | 13 bits | |
| | TTL | 1 byte | |
| | Protocol | 1 byte | |
| | Header checksum | 2 bytes | |
| | Source IP address | 4 bytes | Switch address |
| | Destination IP address | 4 bytes | Cache address |
| IP options | | | None required |
| TCP header | Source port | 2 bytes | |
| | Destination port | 2 bytes | |
| | Data sequence number | 4 bytes | |
| | Ack sequence number | 4 bytes | |
| | Data offset | 4 bits | |
| | Unused | 4 bits | |
| | Bits | 8 bits | ACK |
| | Window | 2 bytes | |
| | Checksum | 2 bytes | |
| | Out of band data pointer | 2 bytes | |
| TCP options | Kind | 1 byte | HUSP flow (e.g., 27) |
| | Length | 1 byte | 16 |
| | Unused | 2 bytes | Always zero |
| | HUSP signal | 4 bits | CTS = 1 |
| | REQ sequence | 12 bits | |
| | Current Transmit Window | 2 bytes | Client's most recently advertised window |
| | Data sequence | 4 bytes | Initial sequence number for data transmitted to client |
| | ACK sequence | 4 bytes | Initial ACK sequence number to be sent to client |

APPENDIX A-continued

Heads Up Switching Protocol Packet Design

| SECTION | FIELD | LENGTH | COMMENTS |
|---|---|---|---|
| | | HUSP ACK | |
| IP header | version | 4 bits | |
| | Header length | 4 bits | |
| | TOS | 1 byte | |
| | Total length | 2 bytes | |
| | Ident | 2 bytes | |
| | Flags | 3 bits | |
| | Fragment offset | 13 bits | |
| | TTL | 1 byte | |
| | Protocol | 1 byte | |
| | Header checksum | 2 bytes | |
| | Source IP address | 4 bytes | Switch address |
| | Destination IP address | 4 bytes | Cache address |
| IP options | | | None required |
| TCP header | Source port | 2 bytes | |
| | Destination port | 2 bytes | |
| | Data sequence number | 4 bytes | |
| | Ack sequence number | 4 bytes | |
| | Data offset | 4 bits | |
| | Unused | 4 bits | |
| | Bits | 8 bits | ACK |
| | Window | 2 bytes | |
| | Checksum | 2 bytes | |
| | Out of band data pointer | 2 bytes | |
| TCP options | Kind | 1 byte | Val = (e.g., 27) |
| | Length | 1 byte | Val = 16 |
| | Unused | 2 bytes | |
| | HUSP signal | 4 bits | ACK = 2 |
| | REQ sequence | 12 bits | |
| | Current transmit window | 2 bytes | Client's most recently advertised receive window |
| | Data sequence | 4 bytes | Always zero |
| | ACK sequence | 4 bytes | Latest ACK sequence number to send to client |
| | | HUSP FIN | |
| IP header | version | 4 bits | |
| | Header length | 4 bits | |
| | TOS | 1 byte | |
| | Total length | 2 bytes | |
| | Ident | 2 bytes | |
| | Flags | 3 bits | |
| | Fragment offset | 13 bits | |
| | TTL | 1 byte | |
| | Protocol | 1 byte | |
| | Header checksum | 2 bytes | |
| | Source IP address | 4 bytes | Cache address |
| | Destination IP address | 4 bytes | Switch address |
| IP options | | | None required |
| TCP header | Source port | 2 bytes | |
| | Destination port | 2 bytes | |
| | Data sequence number | 4 bytes | |
| | Ack sequence number | 4 bytes | |
| | Data offset | 4 bits | |
| | Unused | 4 bits | |
| | Bits | 8 bits | FIN/ACK |
| | Window | 2 bytes | |
| | Checksum | 2 bytes | |
| | Out of band data pointer | 2 bytes | |

APPENDIX A-continued

Heads Up Switching Protocol Packet Design

| SECTION | FIELD | LENGTH | COMMENTS |
|---|---|---|---|
| TCP options | Kind | 1 byte | Val = (e.g., 27) |
| | Length | 1 byte | Val = 16 |
| | Unused | 2 bytes | |
| | HUSP signal | 4 bits | FIN = 3 |
| | REQ sequence | 12 bits | |
| | Current transmit window | 2 bytes | Always zero |
| | Data sequence | 4 bytes | Sequence of last data byte transmitted to client |
| | ACK sequence | 4 bytes | Latest ACK sequence transmitted by the cache to the client |

What is claimed is:

1. A method, comprising:

receiving a first request in a data communications device from a client to access data;

providing a second request to access data to a data access device in response to receiving the first request, the second request including a heads up switching protocol which includes additional connection establishment information that enables establishment of a communication connection between the data access device and the client;

receiving a first response from the data access device in the data communications device in response to the second request, the first response including a heads up switching protocol; and providing a data transfer approval to the data access device in response to receiving the first response, the data transfer approval authorizing the data access device to establish the communication connection to the client by bypassing the data communications device based on the connection establishment information and to provide a second response to the second request to the client by bypassing the data communications device through the communication connection established by the data access device as a result of the data transfer approval.

2. The method of claim 1, where receiving the first request comprises receiving the first request based on a request/response communications protocol, and receiving a content identifier that identifies a requested content; and providing the second request comprises providing the content identifier to enable the data access device to access the requested content.

3. The method of claim 1, where receiving the first request comprises receiving a plurality of first requests from the client to access data;

providing the second request comprises providing a plurality of second requests in response to receiving the first requests, the second requests including a request sequence number; and providing the data transfer approval comprises providing data transfer approvals for the second requests in a sequence based on the request sequence numbers for the second requests.

4. The method of claim 1, where providing the second request comprises providing a plurality of second requests to a plurality of data access devices;

receiving the first response comprises receiving a plurality of first responses from a subset of the plurality of data access devices that received the second requests; and providing the data transfer approval comprises selecting a data access device from the subset of the plurality of data access devices to provide the second response to the second request and providing the data transfer approval to the data access device.

5. The method of claim 4, where the first response includes usage information for each data access device in the subset that indicates a level of usage for each data access device in the subset; and selecting a data access device from the subset of the plurality of data access devices comprises comparing the usage information for all of the data access devices in the subset to determine the data access devices from the subset having a preferable level of usage.

6. The method of claim 1, where the connection establishment information includes a current transmit window for the client that provides a window length for transmitting the second response to the client from the data access device, the window length provided by the client in the first request for use by the data access device when determining a quantity of data to provide in the second response.

7. The method of claim 1, where the data access device is a first data access device, and the connection establishment information includes a location identifier for a second data access device suitable for use if a requested content specified in the first request is unavailable from the first data access device.

8. The method of claim 1, where the connection establishment information is a first set of connection establishment information, and the data transfer approval comprises a second set of connection establishment information, the data transfer approval authorizing the data access device to establish the communication connection to the client based on the first set and the second set of connection establishment information.

9. The method of claim 1, comprising:

receiving a first acknowledgment of the second response in the data communications device over the communication connection; and sending a second acknowledgment from the communications device to the data access device in response to receiving the first acknowledgment indicating that the data communications device received the first acknowledgment from the client.

10. The method of claim 1, comprising:
receiving in the communications device a first termination signal from the data access device in order to terminate a request session with the client; and
providing a second termination signal to the client in response to receiving the first acknowledgment that indicates a request to terminate the request session.

11. A data communications device, comprising:
a processor;
a memory coupled to the processor; and
a communications interface connected to the processor and the memory:
a first receive logic to receive a first request through the communications interface from a client to access data;
a request logic to provide a second request to access data through the communications interface to a data access device in response to receiving the first request, the second request including a heads up switching protocol which includes additional connection establishment information that enables establishment of a communication connection between the data access device and the client;
a second receive logic to receive a first response through the communications interface from the data access device, the first response including a heads up switching protocol; and
an approval logic to provide a data transfer approval through the communications interface to the data access device in response to receiving the first response, the data transfer approval authorizing the data access device to establish the communication connection to the client based, at least in part, on the connection establishment information and to provide a second response to the second request to the client.

12. The data communications device of claim 11, where
the first receive logic is to receive the first request based on a request/response communications protocol, and
a content identifier that identifies a requested content; and
where the request logic is to provide the content identifier to enable the data access device to access the requested content.

13. The data communications device of claim 11, where
the first receive logic is to receive a plurality of first requests to access data from the client;
the request logic is to provide a plurality of second requests in response to the first receive logic receiving the first requests, the second requests including a request sequence number; and
the approval logic is to provide data transfer approvals for a plurality of responses to the second requests in a sequence based on the request sequence numbers for the second requests.

14. The data communications device of claim 11, where
the request logic is to provide a plurality of second requests to a plurality of data access devices;
the second receive logic is to receive a plurality of first responses from a subset of the plurality of data access devices that received the second requests; and
the approval logic is to select a data access device from the subset of data access devices to provide the second response to the second request and where the approval logic is to provide the data transfer approval to the data access device selected from the subset of the plurality of data access devices.

15. The data communications device of claim 14, where the first responses comprise usage information for data access devices in the subset that indicates a level of usage for data access devices in the subset; and
where the approval logic is to compare the usage information for all of the data access devices in the subset to determine the data access devices from the subset having a preferable level of usage.

16. The data communications device of claim 11, where the connection establishment information includes a current transmit window for the client that provides a window length for transmitting the second response to the client from the data access device, the window length provided by the client in the first request for use by the data access device when determining a quantity of data to provide in the second response.

17. The data communications device of claim 11, where the data access device is a first data access device, and the connection establishment information includes a location identifier for a second data access device suitable for use if a requested content specified in the first request is unavailable from the first data access device.

18. The data communications device of claim 11, where the connection establishment information is a first set of connection establishment information, and the data transfer approval includes a second set of connection establishment information, the data transfer approval authorizing the data access device to establish the communication connection to the client based on the first set and the second set of connection establishment information.

19. The data communications device of claim 11, where
acknowledgement logic to receive a first acknowledgment through the communications interface from the client of the second response provided to the client from the data access device over the communication connection; and
where the acknowledgement logic is to forward second acknowledgment through the communications interface to the data access device in response to receiving the first acknowledgment indicating that the data communications device received the first acknowledgment from the client.

20. The data communications device of claim 11, where
a termination logic is to receive a first termination signal through the communications interface from the data access device in order to terminate a request session with the client; and
where the termination logic is to provide a second termination signal through the communications interface to the client in response to receiving the first acknowledgment that indicates a request to terminate the request session.

21. The data communications device of claim 13, where a sequence number for the first requests distinguish the first requests amongst each other such that a first one of the first requests has a corresponding assigned unique sequence number with respect to a corresponding assigned sequence number assigned to a first one of the second requests.

22. The data communications device of claim 15, where the plurality of second requests are forwarded to the data access device of the subset of the plurality of data access devices in response to a determination, based on receiving the first responses, indicating which of the data access devices are most able to service the first request.

23. The data communication device of claim 11, where the data communication device is a switch, and
where the approval logic providing the data transfer approval results in the data access device establishing the communication connection with the client to service the first request, the communication connection from the data access device to the client bypassing the data communication device; and where the connection establishment information in the second request includes a request for content generated by the client, the data access device receiving the request for content prior to establishing a connection between the data access device and the client based on the connection establishment information.

24. The data communication device of claim 23, where the client generates multiple first requests for corresponding different content, the multiple first requests being forwarded form the client to the data communication device, the data communication device generating respective second requests associated with each of the multiple first requests, the data communication device forwarding the respective second requests to two or more data access devices that are able to establish a respective connection and serve requested data, each of the second requests sent from the data communication device to a respective data access device including a request sequence number distinguishing each of the second requests from each other.

* * * * *

UNITED STATES PATENT AND TRADEMARK OFFICE
CERTIFICATE OF CORRECTION

PATENT NO. : 7,624,184 B1
APPLICATION NO. : 09/875543
DATED : November 24, 2009
INVENTOR(S) : Aviani et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1319 days.

Signed and Sealed this

Fourteenth Day of December, 2010

David J. Kappos
*Director of the United States Patent and Trademark Office*